United States Patent
Takahashi

[11] Patent Number: 5,657,513
[45] Date of Patent: Aug. 19, 1997

[54] CORD STOPPER

[75] Inventor: Yoshinobu Takahashi, Toyama-ken, Japan

[73] Assignee: YKK Corporation, Tokyo, Japan

[21] Appl. No.: 510,314

[22] Filed: Aug. 2, 1995

[30]  Foreign Application Priority Data

Aug. 12, 1994  [JP]  Japan .................... 6-190343

[51] Int. Cl.$^6$ ............................................ F16G 11/14
[52] U.S. Cl. ................................ 24/115 G; 24/115 H
[58] Field of Search .......................... 24/115 G, 115 H, 24/712.5, 115 M, 136 R, 136 K, 136 L; 403/211, 374

[56]  References Cited

U.S. PATENT DOCUMENTS

| | | | |
|---|---|---|---|
| 4,680,836 | 7/1987 | Horng | 24/136 R |
| 4,724,584 | 2/1988 | Kasai | 24/136 R |
| 5,197,166 | 3/1993 | Meier et al. | 24/136 R |
| 5,345,657 | 9/1994 | Shimizu | 24/115 G |

FOREIGN PATENT DOCUMENTS

| | | |
|---|---|---|
| 0 228 656 | 7/1987 | European Pat. Off. . |
| 1-39449 | 11/1989 | Japan . |

*Primary Examiner*—James R. Brittain
*Attorney, Agent, or Firm*—Hill, Steadman & Simpson

[57] ABSTRACT

In a cord stopper, a spherical socket has a central plug-insertion hole, a head-receiving recess at the upper end of the hole, and a pair of diametrically opposed locking tongues projecting centrally from the respective edges of the recess. Also the socket has a first cord-threading hole extending perpendicularly to the plug-insertion hole. The plug-insertion hole has a gentle slope extending downwardly centrally from the first-threading hole and a steep slope downwardly contiguous to the gentle slope. A plug has a pair of resilient legs projecting downwardly from a head and having in and through their bases a second cord-threading hole. Each leg has on its lower outside surface a slope, and on its outside surface a protuberance having a central cutout and terminating a guiding end. In use, the plug is pushed into the plug-insertion hole and then a cord is threaded through the first and second cord-threading holes, whereupon if the pressure is released, the plug is urged upwardly under the resilience of the legs to retain the cord.

17 Claims, 6 Drawing Sheets

5,657,513

CORD STOPPER

BACKGROUND OF THE INVENTION

1. Field of the Invention

This invention relates to a fastener for retaining a cord threaded in the peripheral edge of a sleeve, a waist, a collar or a hood such as of a down jacket, a half coat or a ski wear, and more particularly to a cord retainer which is generally called "a cord stopper" and is mounted on a cord at a position near its ends.

2. Description of the Related Art

Japanese Utility Model Publication No. HEI 1-39449 discloses a cord stopper for retaining a cord, which is attached to a helmet, a hat, a sack, a garment, etc., at an arbitrary position.

In the cord stopper, as shown in FIG. 9 of the accompanying drawings, a cylindrical socket has a blind hole, which has at a position toward the closed end an inclined inside wall surface, a first cord-threading hole at a position remote from the closed end, and a locking hole at a position contiguous to the inclined inside wall surface. Between the first cord-threading hole and the locking hole, there are diametrically opposite catch projections. A plug is slidably received in the blind hole, and has in its head a second cord-threading hole, which is adapted to be axially aligned with the first cord-threading hole of the socket, and a pair of resilient legs each terminating in a locking projection are disposed under the head. The plug is inserted into the socket and is pushed against the inclined surface of the socket and the bias of the resilient legs of the plug until the second cord-insertion hole comes into alignment with the first cord-insertion hole so that the cord can be threaded through the first cord-threading hole of the socket and the second cord-threading hole of the plug. When the pressure is released from the plug after threading of the cord, the plug is urged outwardly of the socket by the action of the inclined inside wall surface and under the bias of the resilient legs. As a result, the cord is retained by the friction of the corners of the first and second cord-threading holes.

The known cord stopper mentioned in the foregoing paragraphs has the following problems. Because the locking projections extend from the ends of the resilient legs of the plug, the cord stopper is necessarily long and large in size, which is expensive. Regarding the locking mechanism between the socket and the plug, since the locking projections of the plug to be engaged with the catch projections extend from the ends of the respective resilient legs, the plug tends to be removed from the socket when the locking legs deform resiliently. Further, since a gap exists between the plug and the open end portion of the socket, the plug tends to be inclined with respect to the socket so that a shaking phenomenon would occur to make the retaining of the cord nonstable.

SUMMARY OF THE INVENTION

It is therefore an object of this invention to provide a cord stopper in which the movement of a plug with respect to a socket is smooth without not only accidental removal but also inclination and which can retain a cord securely in a correct posture, the cord stopper being small in size and neat in appearance.

According to this invention, the above object is accomplished by a cord stopper comprising: a socket having a first cord-threading hole extending through the socket and a plug-insertion hole extending perpendicularly to the first cord-threading hole, the plug-insertion hole having on opposite walls a gentle slope and a steep slope; and a plug slidably inserted in the plug-insertion hole from one end and having an second cord-threading hole for being axially aligned with the first cord-threading hole. The plug is composed of a head and a pair of resilient legs projecting from the head, each of the resilient legs having on its outer surface a central protuberance which is resiliently touchable with the gentle slope and terminating in a guiding end which is resiliently touchable with the steep slope.

Preferably, the second cord-threading hole of the plug extends through bases of the pair of resilient legs, and the socket has in the plug-insertion hole above the first cord-threading hole a recess for receiving the head of the plug.

Further, the socket has centrally at a border of the plug-insertion hole and the recess a locking tongue engageable with the second cord-threading hole of the plug, and each of the legs has centrally in the protuberance a cutout for the locking tongue to pass and also has under the second cord-threading hole an inclined surface along its entire width.

In the cord stopper of this invention, both the socket and the head of the plug have a spherical surface of the same radius of curvature and jointly constitutes a sphere.

The manner in which a cord A is secured by the cord stopper of this invention will now be described. Firstly, the head of the plug is pushed from the position of FIG. 2 to slide the protuberance of the legs on and along the gentle and steep slopes of the plug-insertion hole as the legs are compressed, thus forcing the head into the recess of the socket, as shown in FIG. 4, to bring the second cord-threading hole of the plug into alignment with the first cord-threading hole of the socket. With the first and second cord-threading holes aligned with each other, the cord A is threaded through one part of the first cord-threading hole, the second cord-threading hole and the other part of the first cord-threading hole and is then adjusted in securing position. If the pressure is released from the head of the plug, the protuberance is moved from the steep slope to the gentle slope under the bias of the legs and, at the same time, the cord A is clamped and retained by the upper inside edge of the first cord-threading hole and the lower outside edge of the second cord-threading hole as shown in FIG. 5.

For adjusting the securing position of the cord A again, the head of the plug is pushed to bring the second cord-threading hole in alignment with the first cord-threading hole, and then the cord A is adjusted by pulling in one direction or the other, whereupon the cord A can be secured in a desired position by releasing the pressure. The cord stopper shown in FIGS. 7 and 8 operates in the same manner as the foregoing cord stopper.

DETAILED DESCRIPTION OF THE PREFERRED EMBODIMENTS

Figure 1:
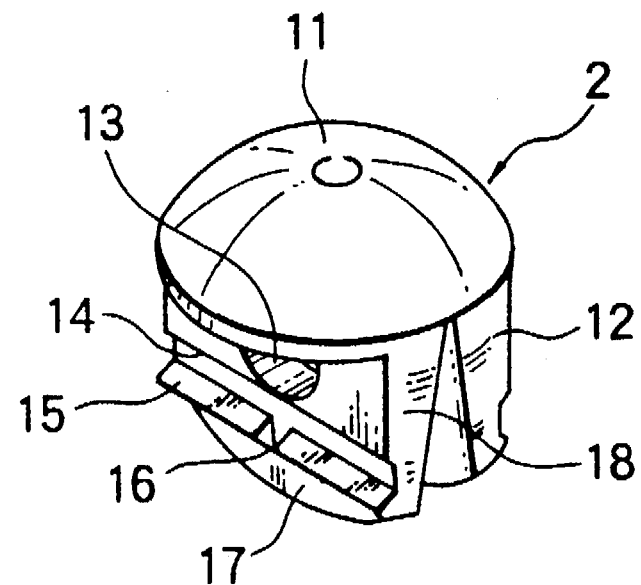
FIG. 1 is an exploded perspective view of a spherical cord stopper.
Figure 1:
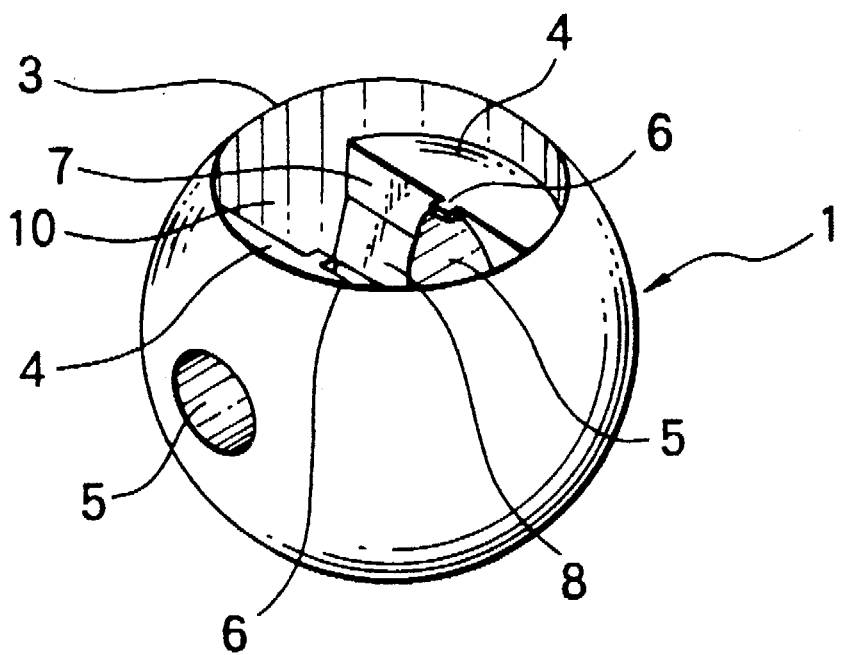
Figure 2:
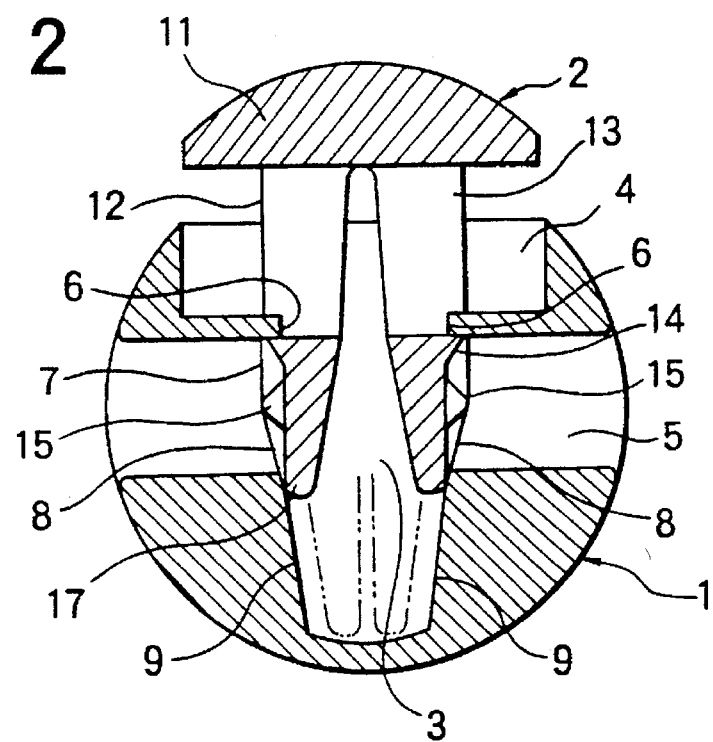
FIG. 2 is a vertical cross-sectional view of FIG. 1, showing the cord stopper after assembled.
Figure 3:
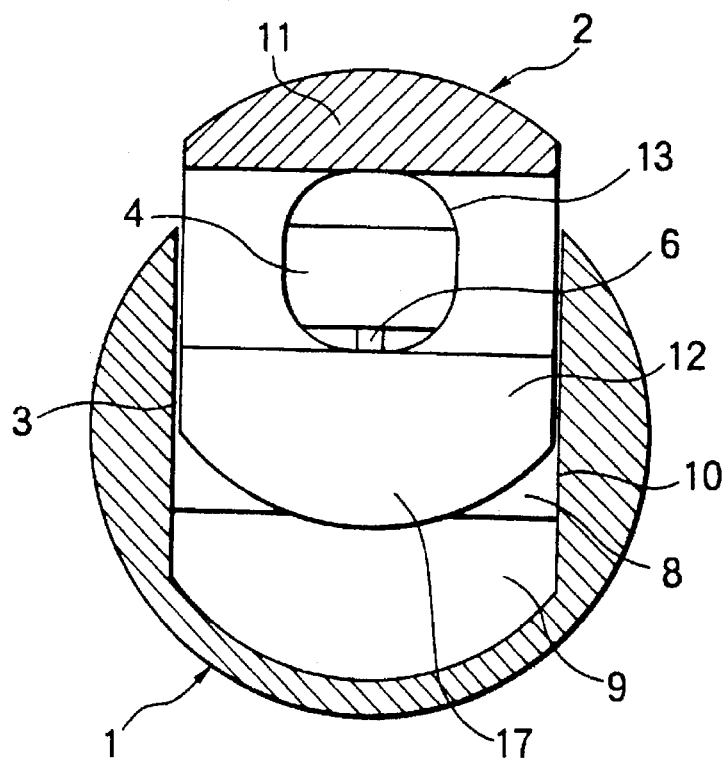
FIG. 3 is a transverse cross-sectional view of FIG. 1, showing the cord stopper after assembled.
Figure 4:
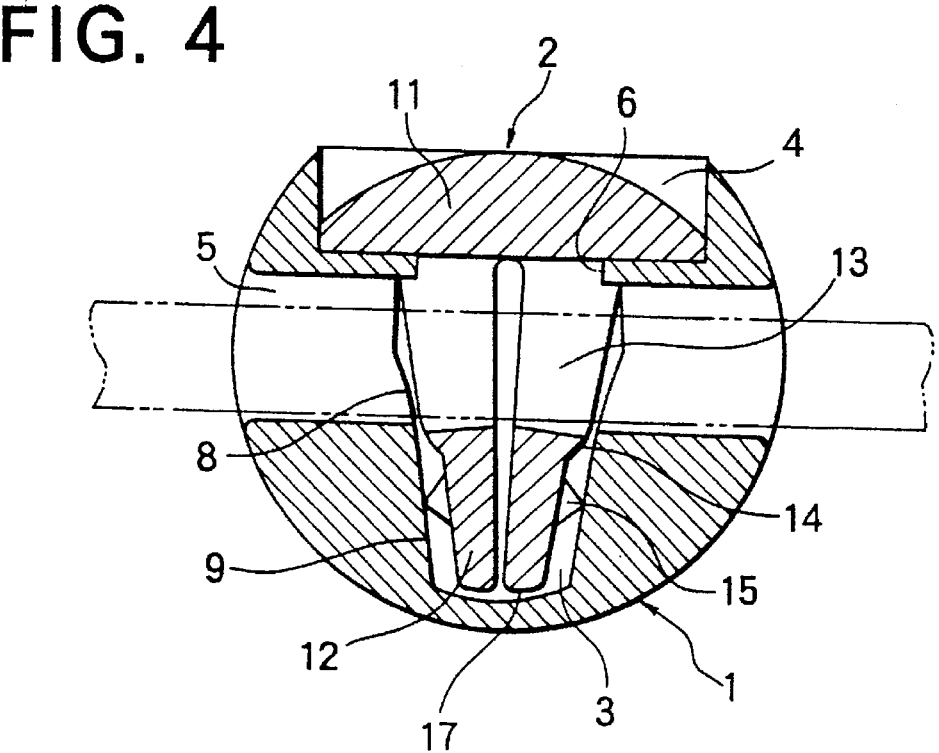
FIG. 4 is a vertical cross-sectional view of FIG. 1, showing the cord stopper when a plug is pushed.
Figure 5:
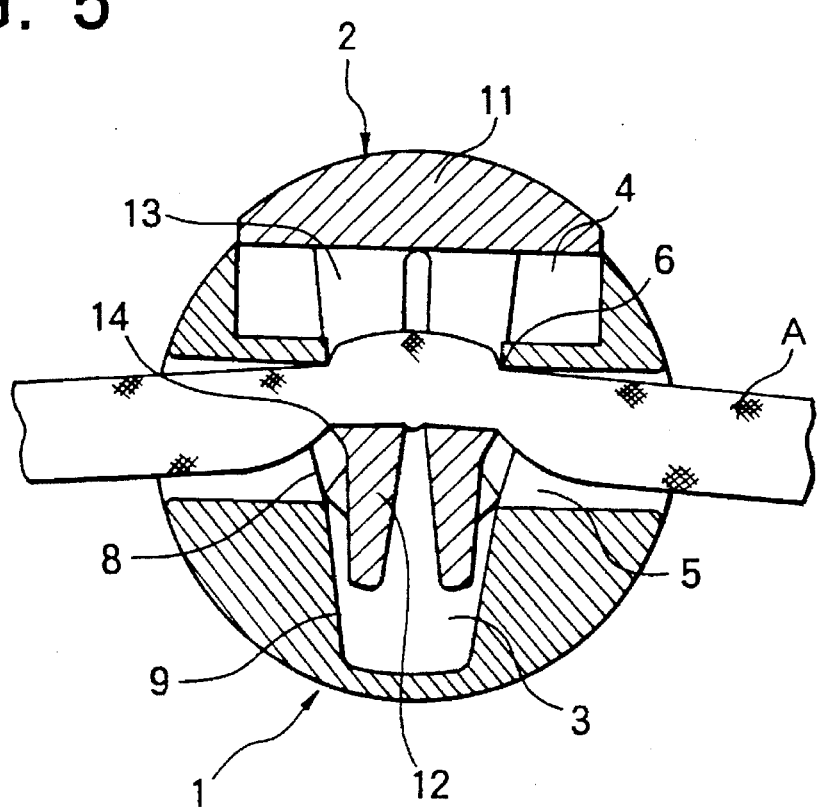
FIG. 5 is a vertical cross-sectional view of FIG. 1, showing the cord stopper when a cord is secured.

Preferred embodiments of a cord stopper of this invention will now be described in detail with reference to the accompanying drawings.

As shown in FIGS. 1 through 5, the cord stopper is a two-member structure composed of a spherical socket 1 and a plug 2 slidably received in the socket 1. Both the socket 1 and the plug 2 are injection molded of synthetic resin such as polyamide, polyacetal or polypropylene.

The spherical socket 1 has a central blind hole 3 for insertion of the plug 2, a head-receiving recess 4 communicating with the open end of the plug-insertion hole 3, and a first cord-threading hole 5 spaced downwardly of the head-receiving recess 4 and extending perpendicularly to the plug-insertion hole 3 for threading of a cord A. The socket 1 has a pair of diametrically opposed central locking tongues 6 between the head-receiving recess 4 and the first cord-threading hole 5. The plug-insertion hole 3 has on its wall having the first cord-threading hole 5 a gentle slope 8 slanting at the central portion of the cord-threading hole 5 from a vertical wall 7. And from the lower end portion of the first cord-threading hole 5 to the bottom of the plug-insertion hole 3 is defined as a steep slope 9. The remaining wall of the plug-insertion hole 3 is an arcuate vertical surface 10.

The plug 2 has a head 11 in the form of part of a sphere, and a pair of resilient legs 12 projecting from the lower surface of the head 11.

The legs 12 have in and through their base portions a second cord-threading hole 13 adapted to be axially aligned with the first cord-threading hole 5 of the socket 1 for threading of a cord A. Each of the resilient legs 12 has on its outer surface a central protuberance 15 terminating in a guiding end 17. The protuberance 15 is triangular in transverse cross section. Each leg 12 has centrally in the protuberance 15 a cutout 16 for the locking tongue 6 to pass and also has under the second cord-threading hole 13 an inclined surface 14 along its entire width.

Figure 6:
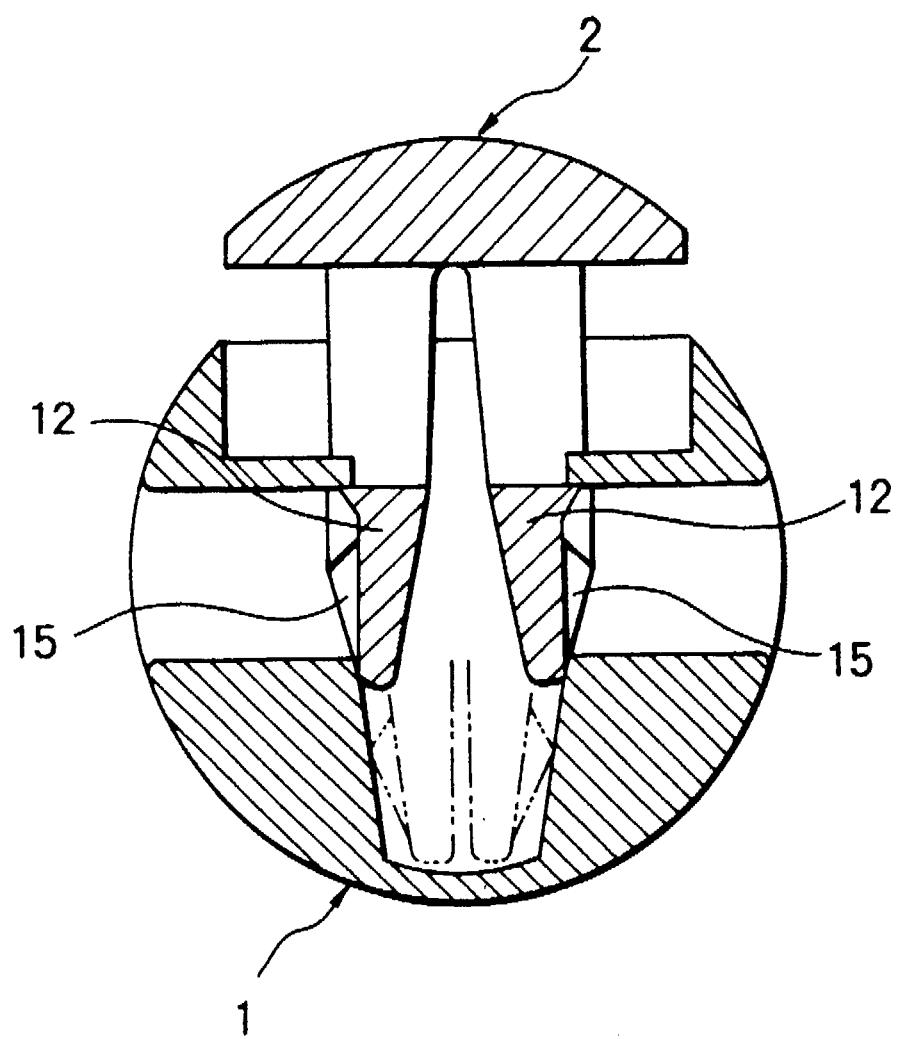
FIG. 6 is a vertical cross-sectional view showing a cord stopper having modified legs.

Both the socket 1 and the head 11 of the plug 2 have a spherical surface of the same radius of curvature and jointly constitutes a substantially sphere when a cord A is secured after the socket 1 and the plug 2 are assembled. The protuberance 15 may lead to the end of the associated leg 12 so as to form an arcuate outer surface as shown in FIG. 6.

For assembling the socket 1 and the plug 2, the pair of legs 12 of the plug 2 is inserted into the plug-insertion hole 3 of the socket 1 along the vertical walls 7 by pushing the head 11 in such a manner that the cutouts 16 of the protuberances 15 are vertically aligned with the respective locking tongues 6. With continued pushing of the head 11, the inclined surfaces 14 ride across the locking tongues 6 at the edge of the head-receiving recess 4 until the locking tongues 6 come into engagement with the second cord-threading hole 13. As a result, the protuberance 15 of the respective leg 12 is set at the border of the vertical wall 7 and the gentle slope 8 of the plug-insertion hole 3, and the guiding end 17 of the respective leg 12 is set at the border of the gentle slope 8 and the steep slope 9. Accordingly each leg 12 resiliently contacts the associated wall surface of the plug-insertion hole 3 at two positions so that the cord stopper is assembled in a stable posture.

Figure 7:
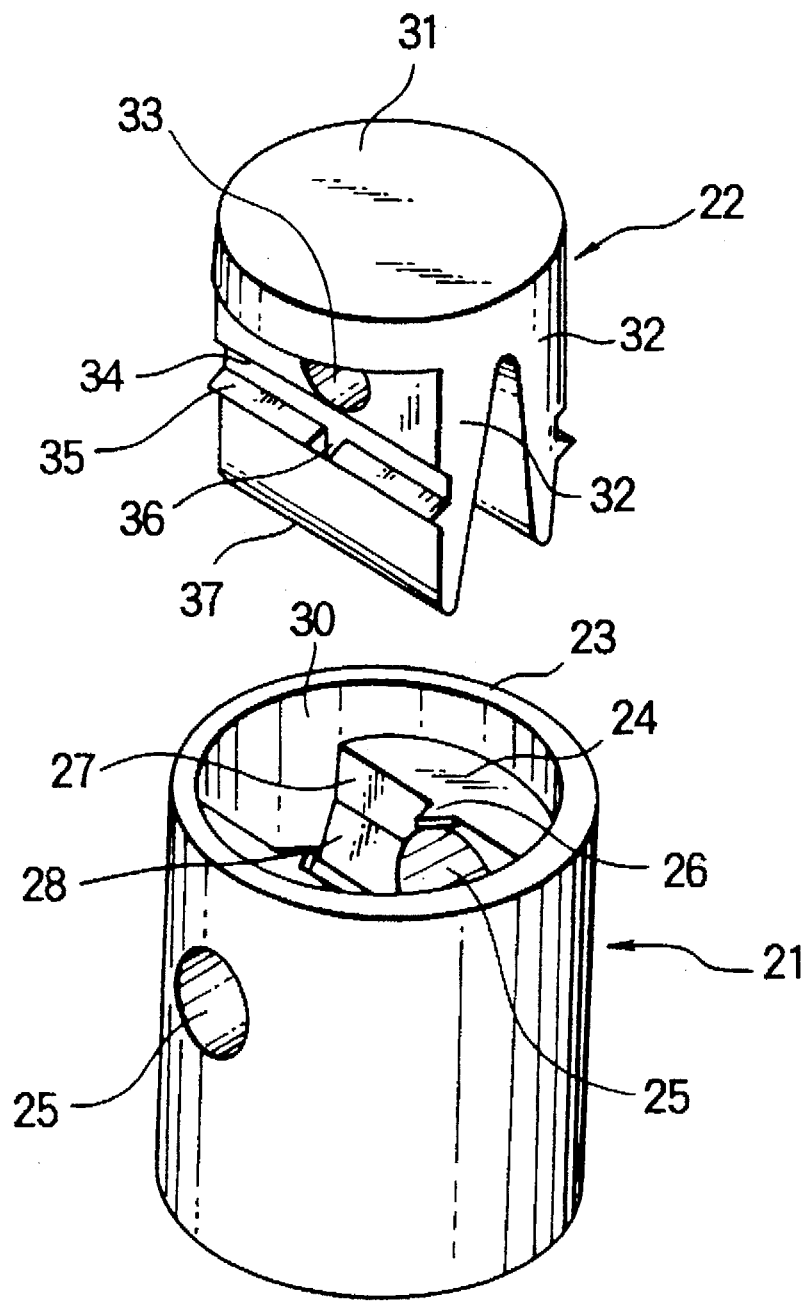
FIG. 7 is an exploded perspective view of a cylindrical cord stopper.
Figure 8:
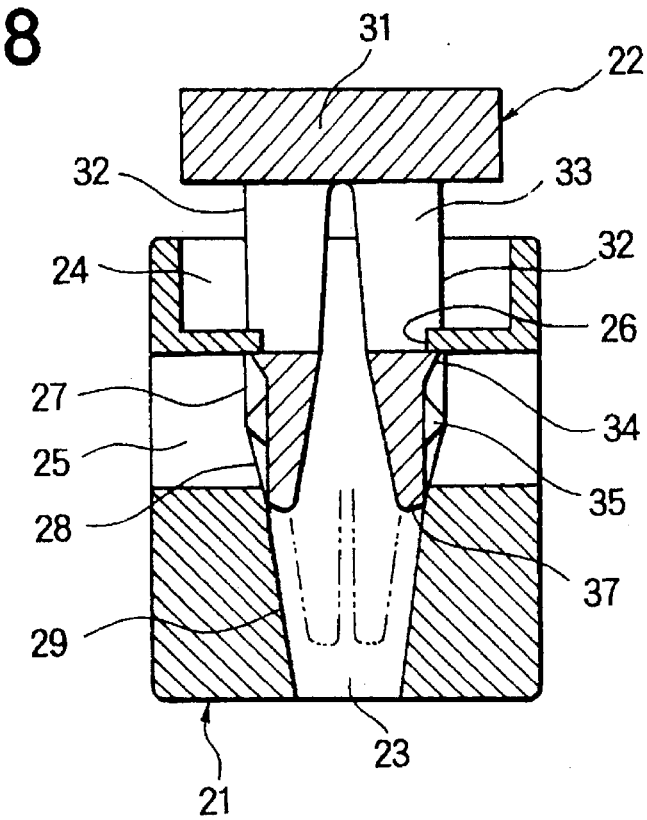
FIG. 8 is a vertical cross-sectional view of FIG. 7, showing the cord stopper after assembled.
Figure 9:
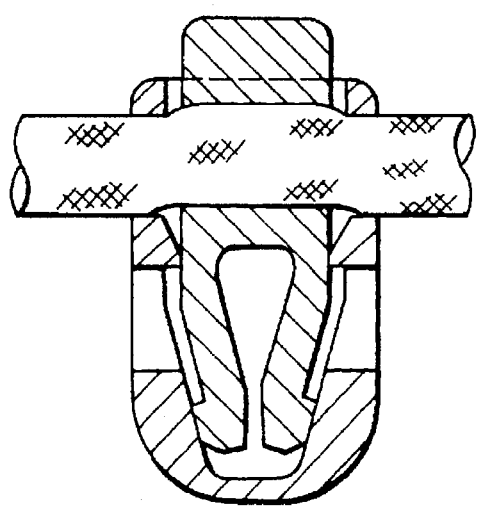
FIG. 9 is a vertical cross-sectional view of a prior art cord stopper in use.

FIGS. 7 and 8 shows a cord stopper according to another embodiment, which is substantially identical in cord securing mechanism with the foregoing embodiments except the entire contour of the cord stopper. Namely, a socket 21 of this cord stopper is cylindrical having a central bottomless plug-insertion hole 23 for insertion of a plug 22. The socket 21, like the socket 1, has at the upper end of the plug-insertion hole 23 a head-receiving recess 24, and a first cord-threading hole 25 spaced downwardly by a gap from the head-receiving recess 24 and extending perpendicularly to the plug-inserting hole 23. Also the socket 21 has a pair of diametrically opposed locking tongues 26 projecting centrally from the opposed edges of the head-receiving recess 24. The plug-insertion hole's wall including the first cord-threading hole 25 is composed of a vertical surface 27, a gentle slope 28 and a steep slope 29 joined in this order. The remaining wall of the plug-insertion hole 23 is an arcuate vertical surface 30.

The plug 22 has a disk-shape head 31 and a pair of resilient legs 32 projecting from the lower surface of the head 31. The legs 32 have in and through their base portions a second cord-threading hole 33 adapted to be axially aligned with the first cord-threading hole 25 of the socket 21 for threading of a cord A. Each of the resilient legs 32 has on its outer surface a central protuberance 35 terminating in a guiding end 37. The protuberance 35 is triangular in transverse cross section. Each leg 32 has centrally in the protuberance 35 a cutout 36 for the locking tongue 26 to pass and also has under the second cord-threading hole 33 an inclined surface 34 along its entire width.

For assembling the socket 21 and the plug 22 together, likewise the first embodiment, the pair of legs 32 of the plug 22 is inserted into the plug-insertion hole 23 of the socket 21 along the vertical wall 27 by pushing the head 31 in such a manner that the cutouts 36 of the protuberances 35 are vertically aligned with the respective locking tongues 26. With continued pushing of the head 31, the inclined surfaces 34 ride across the locking tongues 26 at the edge of the head-receiving recess 24 until the locking tongue 26 come into engagement with the second cord-threading hole 33.

As is apparent from the foregoing description, the cord stopper of this invention gives the following results.

In this cord stopper, the plug-insertion hole 3, 23 of the socket 1, 21 has on its wall the gentle slope 8, 28 and the steep slope 9, 29, and the plug 2, 22 has a pair of resilient legs 12, 32 projecting from the head 11, 31 and each having centrally on its outer surface a protuberance 15, 35. The guiding end 17, 37 of each leg 12, 32 reseliently contacts with the steep slope 9, 29 while the protuberance 15, 35 resiliently contacts with the gentle slope 8, 28. Accordingly, each leg 12, 32 of the plug 2, 22 is resiliently touchable with the wall of the plug-insertion hole 3, 23 of the socket 1, 21 at two positions so that the socket 1, 21 and the plug 2, 22 can be assembled in a stable posture. By selecting the proper angle of inclination of the wall of the plug-insertion hole 3, 23, it is possible to increase the resiliency of the legs 12, 32 and hence to increase the cord securing force.

Further, partly since the second cord-threading hole 13, 33 of the plug 2, 22 extends through the bases of the legs 12, 32, and partly since the socket 1, 21 has at the upper end of the plug-insertion hole 5, 25 a head-receiving recess 4, 24, it is possible to reduce the size of the head 11, 31 of the plug 2, 22 and to facilitate resilient deformation of the legs 12, 32, thus downsizing the whole structure of the cord stopper.

Furthermore, partly since the socket 1, 21 has a pair of locking tongues 6, 26 projecting into the plug-insertion hole 3, 23 to engage with the second cord-threading hole 13, 33 of the plug 2, 22, and partly since the protuberance 15, 35 formed on the outer surface of each leg 12, 32 has a central cutout 16, 36 with inclined surfaces 14, 34 situated downwardly of the second cord-threading hole 13, 33, it is possible to secure the reliable locking of the socket 1, 21 and the plug 2, 22 by a simple structure and it is also possible to insert the plug 2, 22 into the socket 1, 21 in a simple action so that the socket 1, 21 and the plug 2, 22 can be assembled smoothly.

In the socket 1 of FIGS. 1 through 5, since both the socket 1 and the head 11 of the plug 2 have a spherical surface of the same radius of curvature and jointly constitutes a substantially sphere when a cord A is secured after the socket 1 and the plug 2 are assembled, it is possible to realize a ball-shape cord stopper that is small in size and neat in appearance.

What is claimed is:

1. A cord stopper comprising:
   a socket having a first cord-threading hole extending through said socket and a plug-insertion hole extending perpendicularly to said cord-threading hoe, said plug-insertion hole having a receiving end and on each of opposite walls a gentle slope and a steep slope arranged in order extending from said receiving end, said gentle slopes of said opposite walls inclined toward each other in a direction extending inwardly from said receiving end; and
   a plug slidably inserted in said plug-insertion hole from said receiving end and having a second cord-threading hole for being axially aligned with said first cord-threading hole, said plug being composed of a head and a pair of resilient legs projecting from said head, each of said resilient legs having on its outer surface a central protuberance which is resiliently touchable along said gentle slope urging said resilient legs together and in a direction toward said receiving end and each of said legs terminating in a guiding end which is resiliently touchable with said steep slope.

2. A cord stopper according to claim 1, wherein said second cord-threading hole of said plug extends through bases of said pair of resilient legs.

3. A cord stopper according to claim 1 or 2, wherein said socket has in said plug-insertion hole over said first cord-threading hole a recess for receiving said head of said plug.

4. A cord stopper according to claim 3, wherein said socket has centrally at a border of said plug-insertion hole and said recess a locking tongue engageable with said second cord-threading hole of said plug.

5. A cord stopper according to claim 4, wherein each of said legs has centrally in said protuberance a cutout for said locking tongue to pass and also has under said second cord-threading hole an inclined surface along its entire width.

6. A cord stopper according to claim 1 or 2, wherein both said socket and said head of said plug have a spherical surface of the same radius of curvature and said socket and said head jointly constitute a sphere.

7. A cord stopper comprising:
   a socket having a laterally arranged, cord-threading through-hole and a plug-insertion blind-hole extending perpendicularly from an outside of said socket to said cord-threading through-hole, said blind-hole having a recessed opening on an outside of said socket and having an elongate tapered inside surface including a gently sloped taper continuously extending into a steep sloped taper in a direction from said recessed opening inward; and
   a plug slidably inserted in said plug-insertion blind-hole from said recessed opening inwardly, and having a second cord-threading through-hole arranged to axially align with said first cord-threading through-hole when said plug is fully inserted into said plug-insertion blind-hole, said plug having a head and a pair of resilient legs projecting from said head, each of said resilient legs having on its outer surface a centrally arranged protuberance for resiliently sliding along said gentle sloped taper and said steep sloped taper as said plug is inserted into said plug-insertion hole to align said first and second cord-threading through-holes, said gentle sloped taper configured to urge said resilient legs together and in a direction toward said recessed opening, and said legs being arranged to be resiliently slidable along said steep sloped taper to guide insertion of said plug into said plug-insertion blind-hole.

8. A cord stopper according to claim 7, wherein said recessed opening is sized to receive said head of said plug.

9. A cord stopper according to claim 7, wherein said socket comprises a locking tongue extending radially into said tapered bore to engage said second cord-threading through-hole of said plug after insertion of said plug into said socket.

10. A cord stopper according to claim 9, wherein each of said legs includes an inclined surface adjacent said second cord-threading through-hole on a side of said second cord-threading through-hole opposite said head to resiliently close together said legs to allow engagement of said locking tongue to said second cord-threading through-hole.

11. A cord stopper according to claim 7, wherein said second cord-threading through-hole of said plug extends through portions of said resilient legs, and
   said recessed opening is sized to receive said head of said plug,
   wherein said socket has opposed locking tongues extending inwardly into said tapered barrel to be captured in said second cord-threading through-hole upon insertion of said plug into said socket,
   wherein said plug comprises an inclined surface adjacent said second cordthreading through-hole on a side of said second cord-threading through-hole opposite said head, said inclined surface for compressing said resilient legs to allow pass by of said locking tongues to be received in said second cord-threading through-hole,
   wherein each of said legs has a cutout through said protuberance to allow pass by of said locking tongues through said cutout during insertion of said plug into said socket.

12. A cord stopper according to claim 11, wherein both said socket and said head of said plug have a spherical surface of the same radius of curvature and together constitute a sphere.

13. A cord stopper according to claim 11, wherein said socket has an outside shape of a cylinder and said head of said plug has a disk shape surface which closes said cylinder when said plug is inserted into said socket.

14. A cord stopper comprising:
   a socket having a first cord-threading through-hole extending laterally through said socket and a plug-insertion hole extending perpendicularly to said cord-threading through-hole, said plug-insertion hole having a receiving end and on each of opposite walls a gentle slope and a steep slope arranged in order extending from said receiving end, said gentle slopes of said opposite walls inclined toward each other in a direction extending inward from said receiving end at a first acute angle from an axis of said plug insertion hole, said steep slopes of said opposite walls inclined toward each other in a direction extending inward from said receiving end at a second acute angle from said axis of said plug insertion hole;

said first acute angle greater than said second acute angle; and a plug slidably inserted in said plug-insertion hole from said receiving end and having a second cord-threading through-hole for being axially aligned with said first cord-threading through-hole, said plug being composed of a head and a pair of resilient legs projecting from said head, each of said resilient legs having on its outer surface a central protuberance which is resiliently touchable along one of said gentle slopes urging said resilient legs together and in a direction toward said receiving end, said legs being arranged to be guided by one of said steep slopes during insertion of said plug into said socket;

wherein said socket comprises a locking tongue extending radially into said plug insertion hole to engage said second cord threading through-hole of said plug after insertion of said plug into said socket;

wherein each of said legs includes an inclined surface adjacent said second cord-threading through-hole on a side of said second cord-threading through-hole opposite said head to resiliently close together said legs to allow engagement of said locking tongue to said second cord-threading through-hole.

15. A cord stopper according to claim 14, wherein said receiving end is recessed and sized to receive said head of said plug.

16. A cord stopper according to claim 14, wherein both said socket and said head of said plug have a spherical surface of the same radius of curvature and together constitute a sphere.

17. A cord stopper according to claim 14, wherein said socket has an outside shape of a cylinder and said head of said plug has a disk shape surface which closes said cylinder when said plug is inserted into said socket.

* * * * *